(12) United States Patent
Burckart et al.

(10) Patent No.: US 9,294,895 B2
(45) Date of Patent: Mar. 22, 2016

(54) CACHING AT THE WIRELESS TOWER WITH REMOTE CHARGING SERVICES

(75) Inventors: Erik J. Burckart, Raleigh, NC (US); Gennaro A. Cuomo, Cary, NC (US); Victor S. Moore, Lake City, FL (US); Savio Rodrigues, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 12/910,252

(22) Filed: Oct. 22, 2010

(65) Prior Publication Data

US 2012/0102141 A1   Apr. 26, 2012

(51) Int. Cl.
*H04L 12/14* (2006.01)
*H04W 4/18* (2009.01)
*H04M 15/00* (2006.01)
(Continued)

(52) U.S. Cl.
CPC ............... *H04W 4/18* (2013.01); *H04L 12/14* (2013.01); *H04L 12/1403* (2013.01); *H04L 67/2842* (2013.01); *H04M 15/00* (2013.01); *H04W 4/02* (2013.01)

(58) Field of Classification Search
CPC . H04L 12/1403; H04L 12/14; H04L 67/2842; H04M 15/00; H04M 2215/146
USPC .......... 709/203, 213, 217, 218, 219, 227, 238
See application file for complete search history.

(56) References Cited

U.S. PATENT DOCUMENTS

| 6,801,508 B1 | 10/2004 | Lim |
| 6,941,338 B1 | 9/2005 | Madsen |
| 2002/0187775 A1 | 12/2002 | Corrigan et al. |

(Continued)

FOREIGN PATENT DOCUMENTS

| CN | 102171664 | 8/2011 |
| JP | 2004187045 | 7/2004 |

(Continued)

OTHER PUBLICATIONS

Yang, et al., "Two-Level Proxy: The Media Streaming Cache Architecture for GPRS Mobile Network," Information Networking, vol. 3961, Nov. 7, 2006.

(Continued)

*Primary Examiner* — Barbara Burgess
(74) *Attorney, Agent, or Firm* — Steven M. Greenberg, Esq.; CRGO Law

(57) ABSTRACT

A RAN based data processing system is configured for content caching with remote charging services. The system can include a base station that includes an antenna, a receiver, a transmitter, a processor, a local cache, and a network interface to a data communications network. The system also can include an RNC coupled to the base station over the data communications network. The system yet further can include a charging service executing in memory of a host computer recording charges for data services provided in the RAN. Finally, the system can include a caching with remote charging module executing by the processor of the base station. The module can include program code enabled to receive a data request from an end user device, to route the request to a content server in a computer communications network through a coupled CN, to receive a response to the request, to cache the response in the local cache, to forward the response to the end user device, and to transmit data characteristic of the response to the charging service external.

18 Claims, 2 Drawing Sheets

(51) Int. Cl.
*H04W 4/02* (2009.01)
*H04L 29/08* (2006.01)

(56) References Cited

U.S. PATENT DOCUMENTS

| | | | |
|---|---|---|---|
| 2005/0111410 A1* | 5/2005 | Bazar | 370/331 |
| 2008/0096523 A1* | 4/2008 | Lundin et al. | 455/406 |
| 2008/0107026 A1* | 5/2008 | Backman | 370/235 |
| 2008/0109331 A1* | 5/2008 | Stadelmann et al. | 705/34 |
| 2008/0163309 A1* | 7/2008 | Kauranen | 725/62 |
| 2008/0310335 A1* | 12/2008 | Wang et al. | 370/310 |
| 2009/0258634 A1 | 10/2009 | Amine | |
| 2010/0034089 A1* | 2/2010 | Kovvali et al. | 370/235 |
| 2010/0035578 A1* | 2/2010 | Ahmed | 455/411 |
| 2010/0107225 A1* | 4/2010 | Spencer et al. | 726/4 |
| 2010/0145161 A1* | 6/2010 | Niyato et al. | 600/300 |
| 2010/0177680 A1 | 7/2010 | Fischer et al. | |
| 2010/0325239 A1* | 12/2010 | Khedouri et al. | 709/217 |
| 2011/0141887 A1* | 6/2011 | Klein et al. | 370/230 |
| 2011/0202634 A1 | 8/2011 | Kovvali et al. | |
| 2012/0099482 A1 | 4/2012 | Shook et al. | |
| 2012/0142311 A1* | 6/2012 | Rui et al. | 455/406 |
| 2012/0307730 A1* | 12/2012 | Gu | 370/328 |
| 2013/0230056 A1* | 9/2013 | Kauranen | 370/432 |

FOREIGN PATENT DOCUMENTS

| | | |
|---|---|---|
| JP | 2007208997 | 8/2007 |
| WO | WO 01/43390 | 6/2001 |
| WO | WO2010/017308 | 2/2010 |

OTHER PUBLICATIONS

Hayat, et al., "A Caching Architecture for Content Delivery to Mobile Devices," Euromicro, 29th Euromicro Conference, 2003, pp. 241.

* cited by examiner

CACHING AT THE WIRELESS TOWER WITH REMOTE CHARGING SERVICES

BACKGROUND OF THE INVENTION

1. Field of the Invention

The present invention relates to content retrieval services provided in a radio access network and more particularly to the caching of retrieved content in a radio access network.

2. Description of the Related Art

The radio access network (RAN) provides for the foundation of modern cellular telephony. The RAN functions to join different end user mobile devices to a core network (CN) such that individuals can enjoy telephonic and data communications wirelessly within a geographic area covered by the various base stations of the radio access network. Generally speaking, the RAN provides the requisite infrastructure to pass both voice and data traffic from the over-the-air medium to both the terrestrial circuit switched communication network and the packet switched data communications network inclusive of the global Internet.

At present, several standards have been implemented in connection with the RAN. Examples include the global system for mobile communications (GSM), the universal mobile telecommunications system (UMTS) and the GSM "Edge" RAN (GERAN). The RAN generally includes multiple different radio network controllers (RNC) each managing a set of base stations providing wireless connectivity to a geographic cell. The entirety of the different RNCs of the RAN are linked to what is known as the cellular data core or CN through a gateway known as the serving generalized radio packet service node (SGSN). The CN provides various services to customers who are connected by the RAN. One of the main functions is to route calls across the public switched telephone network (PSTN). Another is to route data packets onto an Internet protocol (IP) network such as the global Internet so that end users of the RAN can access services provided by a content delivery network (CDN). To that end, the CN includes a gateway known as the gateway GPRS service node (GGSN).

The typical CDN can provide for advanced content delivery services such as content caching and content filtering. Content caching refers to the intermediate temporary storage of previously retrieved content under the assumption that a temporally proximate subsequent request for the content can be satisfied from temporary storage rather than repeating a more time consuming request for content in the CDN. In contrast, content filtering refers to the restriction of the delivery of requested content when the content meets a particular profile such as being published by a particular source or incorporating particular subject matter. In both instances, the packet processing requisite to performing advanced content services often demand that those services are provided within the CN where the communications protocol utilized in the CN is consistent with that of the global Internet—namely the transport control protocol (TCP) over IP.

Even still, some have suggested placing support for content services such as content caching and content filtering within the RAN. In this regard, United States Patent Application Publication No. 20100034089 by Kovvali et al. suggests the placement of content caching services within the RAN and the extraction of TCP/IP payloads from the RAN protocol specific to the RAN. Notwithstanding, placing content services like caching and filtering even closer to the end user within the various base stations is not desirable in as much as to do so requires hardening of computing devices supporting the content services due to the physical environment of the base station. As such, when content services are performed at the base station, only a minimal computing device is provided to handle only the most basic content services. However, oftentimes it is desirable to perform more than just the most basic content services. For instance, in many instances it is desirable to perform charging services for the content services delivered to end users. To the extent that charging services require more than the most basic computational device, charging services along with the corresponding content services are provided together in the RAN as a matter of convenience.

BRIEF SUMMARY OF THE INVENTION

Embodiments of the present invention address deficiencies of the art in respect to content services in a RAN and provide a novel and non-obvious method, system and computer program product for content caching with remote charging services in a RAN. In an embodiment of the invention, a method for content caching with remote charging services in a RAN has been claimed. The method includes receiving a data request from an end user device in a base station of a RAN and routing the request to a packet switched data communications network from the base station by way of a core network disposed between the RAN and the data communications network. The method also includes receiving a response to the request in the base station, caching the response in a local cache of the base station and forwarding the response to the end user device. Finally, the method includes transmitting data characteristic of the response to a remote charging service external to the base station but within the RAN, for instance a size of the response, a size of the request or both. In one aspect of the embodiment, the transmission of the data characteristic of the response to a remote charging service can include first batching the data characteristic of the response with other data characteristic of other responses to other requests from other end user devices communicating with the base station, and subsequently transmitting the batched data to the remote charging service.

In another embodiment of the invention, a RAN based data processing system can be configured for content caching with remote charging services. The system can include a base station that includes an antenna, a receiver, a transmitter, a processor, a local cache, and a network interface to a data communications network. The system also can include an RNC coupled to the base station over the data communications network. The system yet further can include a charging service executing in memory of a host computer recording charges for data services provided in the RAN. Finally, the system can include a caching with remote charging module executing by the processor of the base station. The module can include program code enabled to receive a data request from an end user device, to route the request to a content server in a computer communications network through a coupled CN, to receive a response to the request, to cache the response in the local cache, to forward the response to the end user device, and to transmit data characteristic of the response to the charging service external.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for content caching with remote charging services in a RAN. In accordance with an embodiment of the invention, a content request can be received in a caching processor executing in memory of a computing device in a base station of a cell in a RAN of a cellular communications network such as a 3G or UMTS cellular communications system. The content request can be inspected to determine if a response to the request can be found in a cache local to the base station. If so, the cached response to the request can be returned to the requesting end user device. Otherwise, a response can be retrieved by way of a CN coupled to the RAN and returned to the end user device. Further, to the extent the response is determined to be cacheable, the response can be placed in the local cache of the base station and a remote charging service external to the base station can be notified of the caching of the response in order to manage billing externally to the base station.

Figure 1:
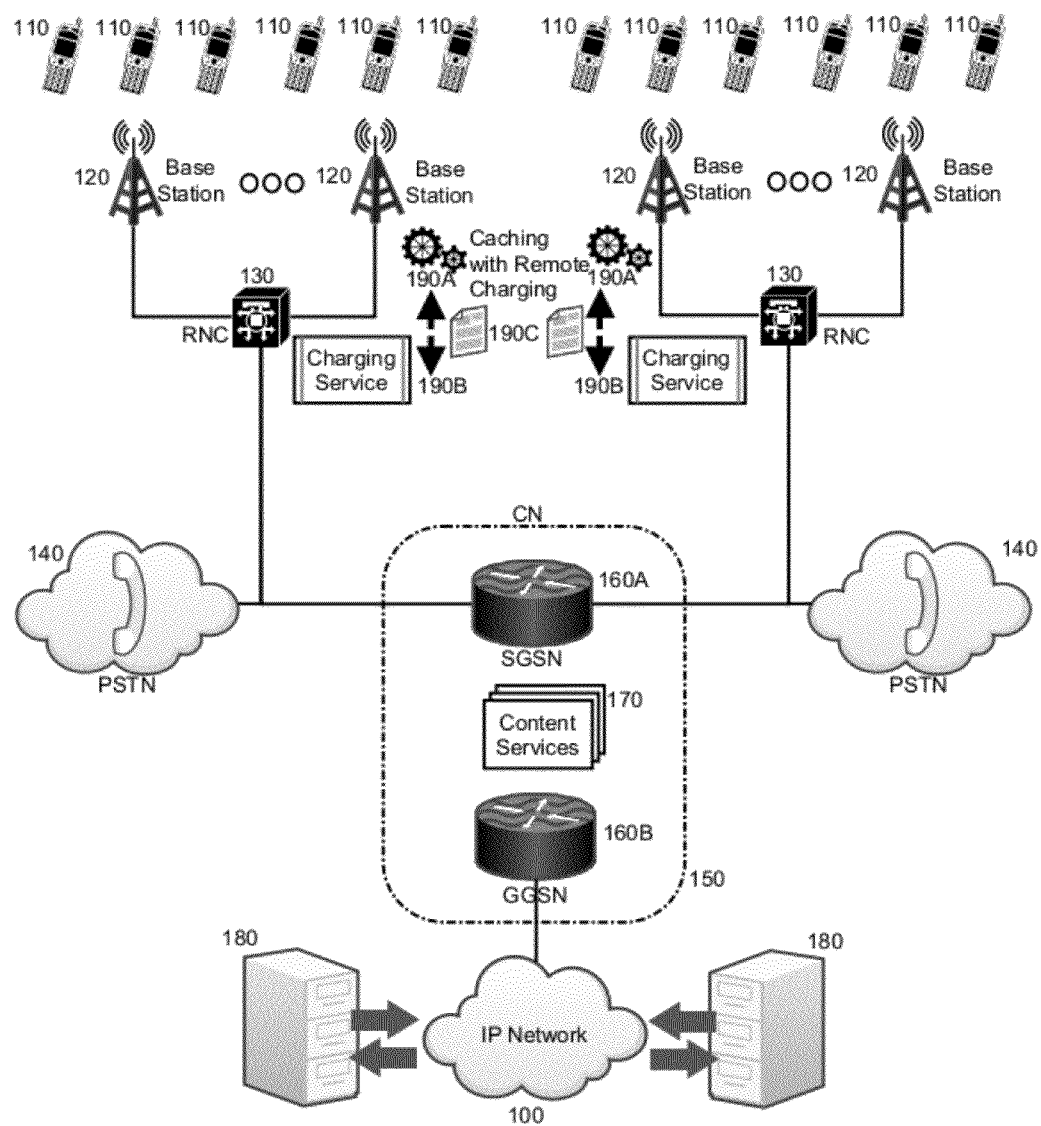
FIG. 1 is a pictorial illustration of a process for content caching with remote charging services in a RAN.

In further illustration, FIG. 1 pictorially depicts a process for content caching with remote charging services in a RAN. As shown in FIG. 1, a cellular telecommunications network can be provided to include different base stations 120 arranged to provide wireless telephonic access to different end user devices 110 for the PSTN 140. Clusters of the base stations 120 can be communicatively linked to a common RNC 130 that in turn can be coupled to a CN 150 thus forming a RAN. The CN 150 can include both a SGSN 160A acting as a gateway for traffic between the CN 150, the PSTN 140 and each RNC 130, and also a GGSN 160B acting as a gateway between the CN 150 and the data communications network 100—typically the global Internet. The CN 150 itself can support a number of content services 170 as is well known in the art.

Of note, a data processing system for caching with remote charging 190A can be disposed in one or more of the base stations 120 and can be configured for communicative coupling to a charging service 190B executing in the RNC 130 externally to the base station 120. The data processing system 190A can include program code that when executes in the data processing system processes content requests stemming from end user devices 110 communicating with the base station 120 to serve locally cached responses to the end user devices 110. The program code when executing further can retrieve responses 190C from content servers 180 on the data communications network 100 by way of the CN 150 that have not been cached and can return those retrieved responses 190C to the end user devices 110. Even yet further, the program code when executing can provide to the charging service 190B data pertaining to the nature of the retrieved responses 190C once cached locally at the base station 120 so that the charging service 190B can process billing resulting from the caching of the retrieved responses 190C.

Figure 2:
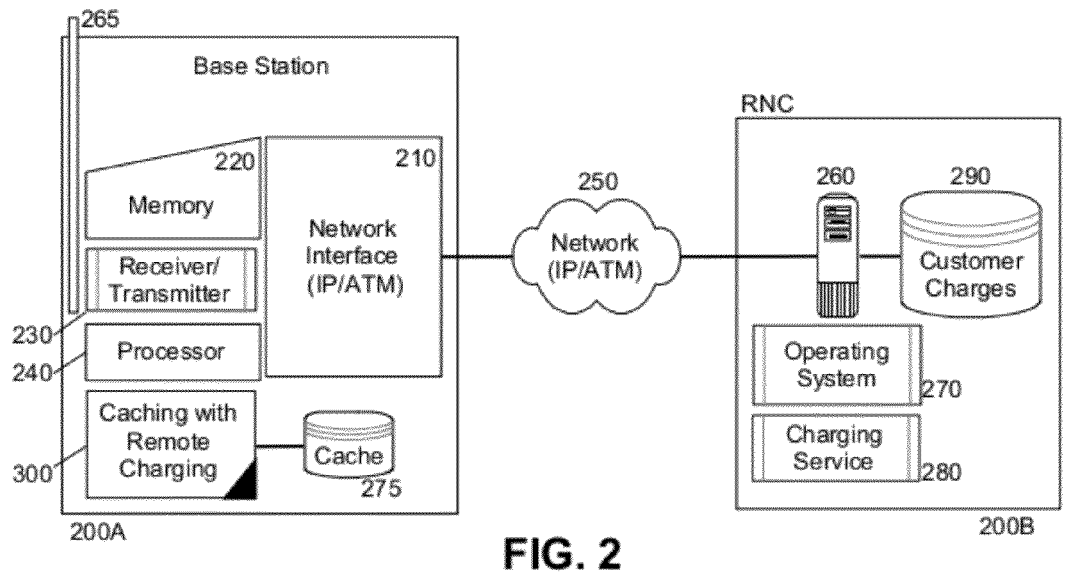
FIG. 2 is a schematic illustration of a RAN based data processing system configured for content caching with remote charging services; and, FIG. 3 is a flow chart illustrating a process for content caching with remote charging services in a RAN.

In yet further illustration, FIG. 2 is a schematic illustration of a RAN based data processing system configured for content caching with remote charging services in a packet data network such as a 2.5G or 3G network. The system can include a base station 200A coupled to an RNC 200B over a communications network 250, commonly an IP network or an asynchronous transfer mode (ATM) network. The base station 200A can include a receiver/transmitter 230 receiving over-the-air communications from different end user devices within transmission range of the base station 200A by way of antenna 265, and routing the same to the RNC 200B by way of a network interface 210. A processor 240 can be provided to perform computational processing on received data as the data is placed in memory 220.

The RNC 200B, in turn, can include a host computer 260 with at least one processor and memory supporting the execution of an operating system 270. The operating system 270 in turn can host the execution of a charging service 280. The charging service 280 can write records to a data store of customer charges 290 in furtherance of service oriented charging of customers for data services provisioned for different customers of the RAN based data processing system. In compliment to the charging service 280, a caching with remote charging module 300 can be disposed in the base station 200A along with a local cache 275 couple to the caching with remote charging module 300.

The caching with remote charging module 300 can include program code that when executed by the processor 240 of the base station 200A can process data requests received from wirelessly coupled end user devices (not shown) by returning cached responses in the local cache 275, or to retrieve the responses from over the data communications network 250 and to cache the retrieved responses in the local cache 275. Further, when a response is placed into the local cache 275, the program code of the caching with remote charging module 300 can provide data characteristic of the cached response and optionally the request to the charging service 280, such as a size of the cached response. In this regard, the caching with remote charging module 300 can provide the characteristic data to the charging service 280 in real-time, or in batch along with other characteristic data for other cached responses.

Figure 3:
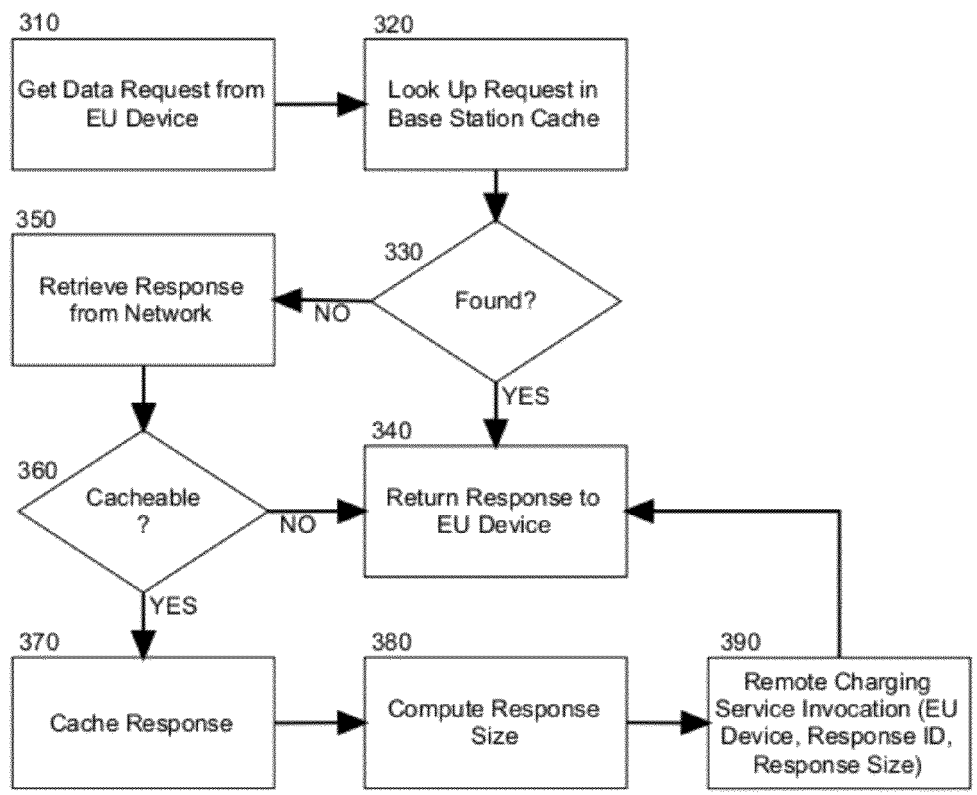

In even yet further illustration, FIG. 3 is a flow chart illustrating a process for content caching with remote charging services in a RAN. Beginning in block 310, a data request can be received in a base station of a RAN from an end user device wirelessly communicating with the base station. In block 320, a local cache in the base station can be consulted for a response to the request. In decision block 330, if a response to the request can be located in the local cache, in block 340 the response can be returned to the end user device. Otherwise, in block 350 a response to the request can be retrieved from a content provider over the Internet by way of a CN and a corresponding RNC and ultimately back to the base station.

In decision block 360, it can be determined whether or not the response is cacheable (for instance whether or not a content filter would prevent the caching of the response). If not, in block 340 the response can be returned to the end user device. Otherwise, in block 370 the response can be placed in the local cache of the base station and in block 380 the size of the response (and optionally of the request leading to the response) can be computed. Thereafter, in block 390, a remote charging service in the RNC can be invoked through an interface to the remote charging service with an identity of the requesting end user device, and the size of the response and optionally an identification of the response and request size. Finally, in block 340 the response can be returned to the end user devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for content caching with remote charging services in a radio access network (RAN), the method comprising:
    receiving a data request from an end user device in a base station of a RAN;
    routing the data request to a packet switched data communications network from the base station by way of a core network disposed between the RAN and the packet switched data communications network;
    receiving a response to the data request in the base station;
    determining whether the response is cacheable upon receiving the response to the data request in the base station by determining whether a content filter prevents caching the response;
    caching the response in a local cache of the base station upon determining that the content filter does not prevent caching the response and forwarding the response to the end user device; and,
    transmitting a data characteristic comprising a size of the response to a remote charging service external to the base station but within the RAN in response to caching the response in the local cache of the base station.

2. The method of claim 1, further comprising:
    determining whether the response to the data request already resides in the local cache; and,
    performing the routing, receiving, caching and transmitting only upon determining that the response to the data request is not already stored in the local cache, but servicing the data request with the response in the local cache in lieu of the routing, receiving, caching and transmitting upon determining that the response to the data request is already stored in the local cache.

3. The method of claim 1, wherein transmitting the data characteristic comprising the size of the response to the remote charging service external to the base station but within the RAN in response to caching the response in the local cache of the base station, further comprises transmitting a size of the data request to the remote charging service external to the base station but within the RAN.

4. The method of claim 1, wherein transmitting the data characteristic comprising the size of the response to the remote charging service external to the base station but within the RAN comprises:
    batching the data characteristic of the response with other data characteristic of other responses to other data requests from other end user devices communicating with the base station; and,
    transmitting the batched data to the remote charging service.

5. The method of claim 1, wherein transmitting the data characteristic comprising the size of the response to the remote charging service external to the base station but within the RAN, comprises transmitting the data characteristic of the response to the remote charging service executing in a computer of a radio network controller (RNC) coupled to the base station in the RAN.

6. The method of claim 1, wherein the RAN is disposed in a packet switched cellular communications system.

7. A radio access network (RAN) based data processing system configured for content caching with remote charging services, the system comprising:
    a base station comprising an antenna, a receiver, a transmitter, a processor, a local cache, and a network interface to a data communications network;
    a radio network controller (RNC) coupled to the base station over the data communications network;
    a charging service executing in memory of a host computer recording charges for data services provided in the RAN; and,
    a caching with remote charging module executing by the processor of the base station, the module comprising program code enabled to receive a data request from an end user device, to route the data request to a content server in a computer communications network through a coupled core network (CN), to receive a response to the data request, to determine whether the response is cacheable upon receiving the response to the data request in the base station by determining whether a content filter prevents caching the response, to cache the response in the local cache upon determining that the content filter does not prevent caching the response, to forward the response to the end user device, and to transmit a data characteristic comprising a size of the response to the charging service external to the base station but within the RAN in response to caching the response in the local cache of the base station.

8. The system of claim 7, wherein the host computer is coupled to the RNC.

9. The system of claim 7, wherein the data communications network coupling the RNC to the base station is an Internet protocol (IP) network.

10. The system of claim 7, wherein the data communications network coupling the RNC to the base station is an asynchronous transfer mode (ATM) network.

11. A computer program product for content caching with remote charging services in a radio access network (RAN), the computer program product comprising:
    a computer readable storage memory having computer readable program code embodied therewith, the computer readable program code comprising:
    computer readable program code for receiving a data request from an end user device in a base station of a RAN;
    computer readable program code for routing the data request to a packet switched data communications network from the base station by way of a core network disposed between the RAN and the packet switched data communications network;
    computer readable program code for receiving a response to the data request in the base station;
    computer readable program code for determining whether the response is cacheable upon receiving the response to the data request in the base station by determining whether a content filter prevents caching the response;

computer readable program code for caching the response in a local cache of the base station upon determining that the content filter does not prevent caching the response and forwarding the response to the end user device; and, computer readable program code for transmitting a data characteristic comprising a size of the response to a remote charging service external to the base station but within the RAN in response to caching the response in the local cache of the base station.

12. The computer program product of claim 11, further comprising:

computer readable program code for determining whether the response to the data request already resides in the local cache; and, computer readable program code for performing the routing, receiving, caching and transmitting only upon determining that the response to the data request is not already stored in the local cache, but servicing the data request with the response in the local cache in lieu of the routing, receiving, caching and transmitting upon determining that the response to the data request is already stored in the local cache.

13. The computer program product of claim 11, wherein the computer readable program code for transmitting the data characteristic comprising the size of the response to the remote charging service external to the base station but within the RAN in response to caching the response in the local cache of the base station, further comprises computer readable program code for transmitting a size of the data request to the remote charging service external to the base station but within the RAN.

14. The computer program product of claim 11, wherein the computer readable program code for transmitting the data characteristic comprising the size of the response to the remote charging service external to the base station but within the RAN comprises:

computer readable program code for batching the data characteristic of the response with other data characteristic of other responses to other data requests from other end user devices communicating with the base station; and, computer readable program code for transmitting the batched data to the remote charging service.

15. The computer program product of claim 11, wherein the computer readable program code for transmitting the data characteristic comprising the size of the response to the remote charging service external to the base station but within the RAN, comprises computer readable program code for transmitting the data characteristic of the response to the remote charging service executing in a computer of a radio network controller (RNC) coupled to the base station in the RAN.

16. The computer program product of claim 11, wherein the RAN is disposed in a packet switched cellular communications system.

17. The computer program product of claim 16, wherein the packet switched cellular communications system is a 3G cellular communications system.

18. The computer program product of claim 16, wherein the packet switched cellular communications system is a universal mobile telecommunications system (UMTS) cellular communications system.

* * * * *